Figure 1:
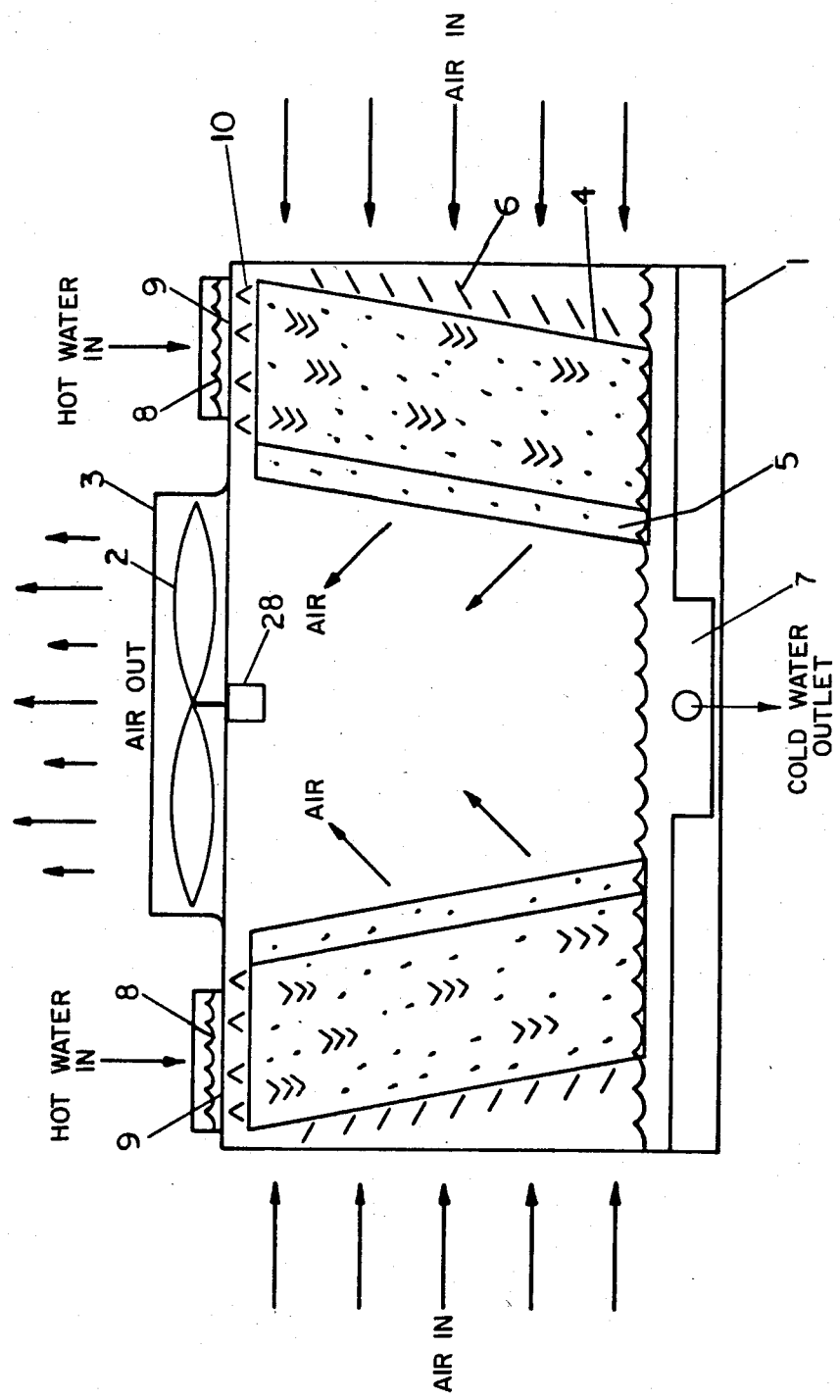

United States Patent [19]

Scrivnor

[11] Patent Number: 4,592,878

[45] Date of Patent: Jun. 3, 1986

[54] ROTARY FLOW CONTROL BALANCING VALVE FOR CROSS-FLOW COOLING TOWERS

[75] Inventor: Warren A. Scrivnor, Catonsville, Md.

[73] Assignee: Baltimore Aircoil Company, Inc., Jessup, Md.

[21] Appl. No.: 655,498

[22] Filed: Sep. 28, 1984

[51] Int. Cl.⁴ .............................................. B01F 3/04
[52] U.S. Cl. ................. 261/111; 137/625.32; 239/569; 261/97; 261/110; 261/DIG. 11
[58] Field of Search .................. 261/71, 97, 110, 111, 261/155, DIG. 11; 239/569; 137/625.32; 210/418, 428, 429, 135; 165/60, DIG. 1

[56] References Cited

U.S. PATENT DOCUMENTS

| | | | |
|---|---|---|---|
| 1,403,003 | 1/1922 | Beatson | 137/625.32 X |
| 2,650,082 | 8/1953 | Mart | 261/110 |
| 2,961,226 | 11/1960 | Goettl | 261/97 X |
| 3,064,677 | 11/1962 | Wright et al. | 261/97 X |
| 3,132,190 | 5/1964 | Engalitcheff, Jr. | 261/155 X |
| 3,282,248 | 11/1966 | Mann et al. | 137/625.32 X |
| 3,349,788 | 10/1967 | Chester | 137/625.32 X |
| 3,526,248 | 9/1970 | Billeter | 137/625.32 X |
| 3,561,487 | 2/1971 | Reed, Jr. | 137/625.32 |
| 3,875,269 | 4/1975 | Forchini et al. | 261/DIG. 11 |
| 3,998,394 | 12/1976 | Ovard | 261/DIG. 11 |

FOREIGN PATENT DOCUMENTS 348029 2/1922 Fed. Rep. of Germany ........................ 137/625.32

*Primary Examiner*—Richard L. Chiesa
*Attorney, Agent, or Firm*—Charles E. Bouton; Edward J. Brosius

[57] ABSTRACT

There is provided a rotary flow control balancing valve and an integral predistribution box for use with gravity feed cross-flow cooling towers. The valve and predistribution box provide for the balancing of flows between halves of a cross-flow cooling tower or between or among separate cooling towers and also for maximizing the uniformity of the hot water flow in the predistribution pan and the distribution pan.

10 Claims, 2 Drawing Figures

ROTARY FLOW CONTROL BALANCING VALVE FOR CROSS-FLOW COOLING TOWERS

BACKGROUND OF THE INVENTION

Previously in cross-flow cooling towers, where there was a need to balance the two halves of such a tower, or to balance separate units, this was accomplished by placing a butterfly valve in the hot water inlet pipe. However, this system suffered from the disadvantage of adversely affecting the water flow distribution downstream of the valve such that the water flow was non-uniform over the predistribution pan thereby leading to non-uniform distribution of water to the fill chamber and subsequent reduced thermal performance. In addition, such a system added significantly to the height of the overall system thus necessitating the separate shipment of the valve parts and field assembly when the oversized unit could not be shipped.

SUMMARY OF THE INVENTION

The instant invention provides for a rotary flow control balancing valve and predistribution box for a gravity feed cross-flow cooling tower. Thus it is an object of this invention to describe such a valve. It is a further object to describe the function of such a valve and the advantages offered over previous systems. A further object is to provide for a rotary valve which will allow for the flow at the outlet of a cooling tower hot water pipe to be easily regulated to balance the two halves of a tower with each other or to balance separate towers. A still further object is to provide for a valve means which will issue the circumferentially uniform release of water from the hot water pipe. A still further object is to provide for an optional flow arrangement to cause a predicted directionality of water flow. Further objects will become apparant from a reading of the following description.

DESCRIPTION OF THE INVENTION

The instant invention is best described by reference to the two figures provided. FIG. 1 is a cross-sectional view of a typical cross-flow cooling tower, 1. The various flows of the ambient air in, the warmed, humidified air out, the hot water in and the cold water out are shown with bold arrows. The cooling tower 1 is provided with a fan 2 powered by a motor 28 for causing air movement through the tower system. In this case, the fan and motor are mounted at the top of the unit in a fan housing 3. The fill material 4 provides for an increased surface area of the water, applied thereto as a spray 10, in order to increase the evaporation rate. Adjacent the fill is a mist-eliminator 5 and louvers 6 to prevent water from splashing outside the tower. The cold water from the fill enters the cold water sump 7 for return to the heat generating system (not shown) and then back to the hot water inlet. At the top of each half of the cooling tower is shown the predistribution pan 8 and the water distribution pan 9. The valve of the instant invention is fitted at the outlet of the hot water inlet which feeds the predistribution pan.

Figure 2:
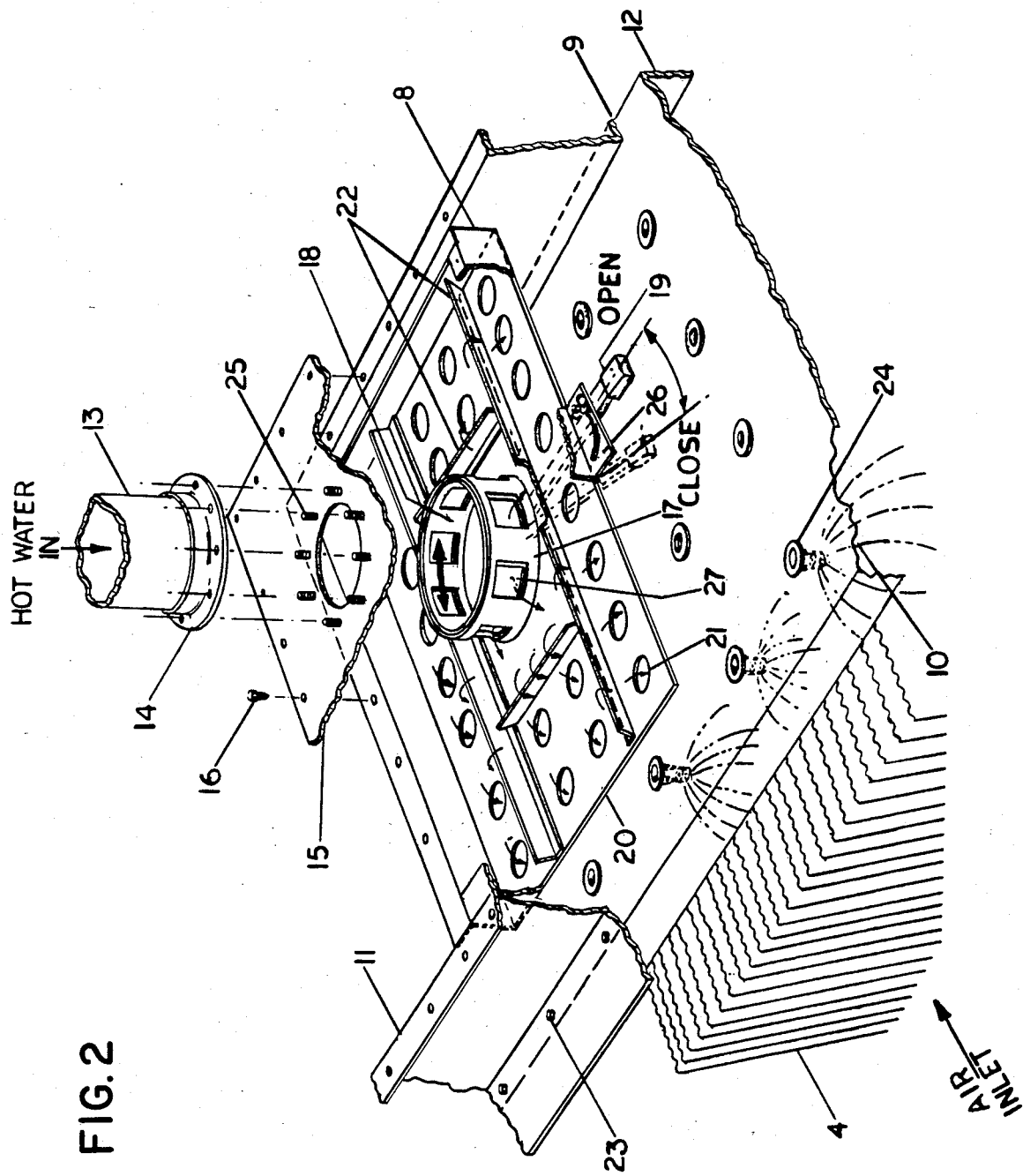

Referring now to FIG. 2, there is shown one specific arrangement of the instant rotary flow control balancing valve and the predistribution pan and distribution pan with which it is associated. When objects appear in both figures, the same number is used for identification.

In FIG. 2, the air flow is shown entering the fill material 4 which provides for the increased surface area for the maximum evaporation rate. The water is provided to the fill material from the distribution pan 9 which is composed of side member 11 around the perimeter of the pan and a bottom plate 12. The side members and bottom plate are attached typically by bolts 23 and usually are provided with sealing means (not shown). To insure the proper distribution of water, the bottom pan 12 is provided with a plurality of openings through which the water is applied to the fill. Generally, the openings are provided with nozzles 24 to generate a spray 10 which helps to assure uniform distribution of the water over the top of the fill 4.

Located proximally to the distribution box, usually directly over the distribution box is the predistribution box 8. The predistribution box 8 is provided with a top 15 and a bottom 20, which are attached by bolts 16 or other suitable mounting means. The bottom is provided with a plurality of openings 21 of any desired shape, most typically circular, to evenly distribute the water to the distribution pan 9 below.

It is an important aspect of this invention that the rotary flow control balancing valve, the predistribution box and the distribution pan be integrally constructed with the valve integral with and contained within the boundaries of the perimeter of the conventional hot water predistribution box. In this way the unit can be constructed with minimal addition to the overall height of the unit and the prior necessity of field construction of separately shipped parts can be avoided. By being integral the valve can be constructed without elaborate and expensive seals, because any leakage in the non-sealed valve would merely leak into the predistribution box where the water is intended to go.

Hot water is provided to the predistribution pan 8 through the hot water inlet 13 which is affixed with a flange 14. The flange/hot water inlet is attached to the top of the predistribution pan 15 with, for example, bolts 25. Generally also, sealing means are provided therebetween to eliminate water escape.

The rotary flow control balancing valve of this invention is composed of two cylindrically shaped sections; a stationary section 17 and a concentrically arranged movable internal ring section 18. The valve sections are situated between the top and the bottom of the predistribution pan, taking up substantially the full internal height of the predistribution pan. Usually the stationary section is external to the moveable section. The stationary section is mounted to the top and/or bottom of the predistribution pan, preferably the bottom. Both the stationary and movable sections of the valve have holes or weirs 27 in the sides thereof, through which the hot water from the hot water inlet 13 passes. The aggregate area of the holes when the valve is fully opened, is equal to or preferably slightly greater than the cross-sectional area of the hot water inlet 13. The holes may be square, as shown, or they may be of any other desired shape such as circular, oval, triangular and the like. In addition, the holes or weirs in the stationary and movable sections may be congruent and arranged squarely with respect to the surfaces of the predistribution box as shown, or optionally they may be arranged with a different orientation such as to provide for intersecting square or triangular holes such that the corners of such shapes will intersect to provide for a finer control at flow rate positions of less than fully open valve settings.

The holes or weirs 27 may be arranged uniformly spaced around the perimeter of the valve sections as shown, which will provide for a uniform 360° outward distribution of the hot water over the surface of the bottom of the predistribution pan 20. The pan bottom has affixed thereto a series of baffles 22 which assist in uniformly distributing the water over the bottom surface 20 and into the holes 21.

Alternatively, where the distribution pan 9 or the predistribution pan 8 is of such a shape that exactly 360° uniform water flow is not required, the holes 27 may be arranged about the surfaces of the valve members in a non-uniform manner to direct greater water flow in certain directions and less water flow in other directions. This would be appropriate when the cooling tower distribution basin was of a greatly elongated rectangular shape.

The degree of flow of water through the holes 27 is controlled with the flow control lever 19 which is connected to the movable member 18 of the valve. By moving the flow control lever the movable member 18 is rotated within or about the stationary member 17 so that the holes 27 will be made progressively more or less to match and increase flow or mismatch and block flow. Where the holes, for example initially are full matched, that is, the valve is fully opened, moving the lever will cause the movable member 18 to progressively cover the holes 27 in the stationary member 17, thus reducing the flow of water through said holes. The travel of the lever 19 may be restricted to cause it to stop at a predetermined position, either fully closed, that is where the solid portions of the movable member 18 completely cover the holes 27 in the stationary member 17, or the stop may be arranged to allow only flow reduction to a certain specified minimum. An assured minimum flow may be created by stopping the lever 19, before the holes in the stationary member 17 are fully covered, or by having differently shaped holes, or differently arranged holes such that a portion of the holes of both the stationary and movable members always match.

In addition, a locking device 26 is provided such that once the correct balance of the flow rates is obtained, the lever 19 can be secured to prevent any accidental misadjustments. The locking means may be typically thumbscrew or any other convenient means which would secure lever 19.

While the instant rotary flow control balancing valve finds the immediate utility in the field of cross-flow cooling towers with gravity feed distribution systems, it is envisioned that this invention may find utility in other systems involving water flow from a central inlet to a distribution system. In particular the instant valve may find utility in a water treatment plant where inlet water must be distributed over a filter bed.

Further, the instant valve may find utility, not at the outlet of a water-flow system, but within a closed system at a junction where the liquid flow could be uniformly distributed to a multiplicity of outlet branches with the appropriate arrangement of holes 27.

It is also considered feasible in such a situation to have a second, separately controllable movable member 18, which may be a separated section of movable member 18, or a multiplicity of concentric movable sections, each separately controlled, with holes suitably arranged so as to provide separate control to a multiplicity of outlets.

It will be appreciated that the instant rotary flow control balancing valve can also be successfully employed in those evaporative heat and mass exchange apparatus which involve similar water distribution systems such as evaporative condensers, closed circuit fluid coolers, and the like.

These and other arrangements of this invention are to be limited only by the scope of the claims appended hereto and not by any particular arrangement shown in the specification.

What is claimed is:

1. An evaporative heat and mass exchange apparatus with a hot water inlet to a gravity water distribution system to a fill material wherein ambient air is forced over the surface of the fill by air distribution means to cause evaporative cooling of the water as it proceeds to the cold water sump, comprising a rotary flow control balancing valve located within a predistribution box with said hot water inlet affixed to the top of said predistribution box allowing water to pass therethrough, said valve comprising a cylindrically shaped stationary portion affixed to the predistribution box, and a concentrically arranged movable portion, both portions of a height substantially equivalent to the inside height of said predistribution box, with both portions having holes therethrough, said movable portion being provided with control means for progressive rotation of said movable portion within or about said stationary portion to increase or decrease water flow through those sections of the holes of the stationary and movable portions which are in alignment, to allow water to flow onto the bottom of the predistribution box and thence into the gravity distribution system.

2. The evaporative heat and mass exchange apparatus of claim 1 which is an evaporative condenser with at least one integral valve and predistribution box.

3. The evaporative heat and mass exchange apparatus of claim 1 which is a closed circuit fluid cooler with at least one integral valve and predistribution box.

4. The evaporative heat and mass exchange apparatus of claim 1 which is a cross-flow cooling tower with at least one integral valve and predistribution box.

5. The cross-flow cooling tower of claim 4 which includes locking means to secure the position of said movable portion.

6. The air flow cooling tower of claim 4 wherein said holes are non-uniformly arranged about the perimeter of said stationary and movable portions.

7. The air flow cooling tower of claim 4 wherein said holes have one shape and size in said movable portion, and a different shape and size in said stationary portion.

8. The cross-flow cooling tower of claim 4 wherein said holes are uniformly distributed about the perimeter of said stationary and movable portions.

9. The cross-flow cooling tower of claim 8 wherein said holes are the same size and shape on both said stationary and movable portions.

10. The cross-flow cooling tower of claim 9 wherein said holes are square.

* * * * *